(12) United States Patent
Ye et al.

(10) Patent No.: US 12,507,258 B2
(45) Date of Patent: Dec. 23, 2025

(54) RANGE EXTENSION FOR Sidelink Control Information (SCI) STAGE 2

(71) Applicant: Apple Inc., Cupertino, CA (US)

(72) Inventors: Chunxuan Ye, San Diego, CA (US); Yushu Zhang, Beijing (CN); Dawei Zhang, Saratoga, CA (US); Haijing Hu, Los Gatos, CA (US); Haitong Sun, Cupertino, CA (US); Wei Zeng, Saratoga, CA (US); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/593,833

(22) PCT Filed: Oct. 15, 2020

(86) PCT No.: PCT/CN2020/121226
§ 371 (c)(1),
(2) Date: Sep. 24, 2021

(87) PCT Pub. No.: WO2022/077364
PCT Pub. Date: Apr. 21, 2022

(65) Prior Publication Data
US 2023/0239899 A1 Jul. 27, 2023

(51) Int. Cl.
*H04W 72/25* (2023.01)
*H03M 13/00* (2006.01)
(Continued)

(52) U.S. Cl.
CPC ........... *H04W 72/25* (2023.01); *H03M 13/09* (2013.01); *H03M 13/13* (2013.01);
(Continued)

(58) Field of Classification Search
CPC . H04W 72/02; H04W 72/044; H04W 72/046; H04W 72/0466; H04W 72/0446;
(Continued)

(56) References Cited

U.S. PATENT DOCUMENTS 11,588,581 B2 * 2/2023 Yeo .................. H04L 5/0053
2020/0336253 A1 * 10/2020 He .................. H04W 72/23
(Continued)

FOREIGN PATENT DOCUMENTS

| WO | 2020063611 A1 | 4/2020 |
| WO | 2020146634 A1 | 7/2020 |
| WO | 2020160709 A1 | 8/2020 |

OTHER PUBLICATIONS

Samsung, "Feature lead summary#2 for 7.2.4.1 Physical layer structure for sidelink," 3GPP Draft, R1-1905725, vol. RAN WG1 #96bis Meeting, Apr. 15, 2019, XP051707782, Retrieved from the Internet: URL: http://www.3gpp.org/ftp/tsg%5Fran/WG1%5FRL1/TSGR1%5F96b/Docs/R1%2D1905725%2Ezip [retrieved on Apr. 15, 2019].

(Continued)

*Primary Examiner* — Huy D Vu
*Assistant Examiner* — Scott A Schlack
(74) *Attorney, Agent, or Firm* — Blank Rome LLP

(57) ABSTRACT

In 5G/New Radio (NR), sidelink communication refers to a channel for communications directly between devices, e.g., user equipment (UEs), without use of traditional uplink or downlink communication channels. Sidelink Control Information (SCI) is separated into two stages (i.e., SCI stage 1 and SCI stage 2) before being transmitted to configure a user device. A method for configuring sidelink communications for a wireless device includes: obtaining SCI Stage 2 payload information; attaching and distributing cyclic redundancy check (CRC) information to the payload information;
(Continued)

performing encoding and rate matching (RM) on the payload information; scrambling the encoded and rate matched payload information; performing modulation on the scrambled payload information; determining a resource mapping for the modulated payload information, wherein the modulated payload information is aggregated across two or more slots (e.g., using different processing operations for at least two slots); and transmitting the modulated payload information according to the determined resource mapping.

18 Claims, 13 Drawing Sheets

(51) Int. Cl.
*H03M 13/09* (2006.01)
*H03M 13/13* (2006.01)
*H03M 13/29* (2006.01)
*H04L 1/00* (2006.01)
*H04L 1/08* (2006.01)
*H04L 1/1829* (2023.01)
*H04L 5/00* (2006.01)

(52) U.S. Cl.
CPC ..... *H03M 13/2906* (2013.01); *H03M 13/635* (2013.01); *H04L 1/0041* (2013.01); *H04L 1/0057* (2013.01); *H04L 1/0061* (2013.01); *H04L 1/0076* (2013.01); *H04L 1/08* (2013.01); *H04L 1/1864* (2013.01); *H04L 5/0053* (2013.01)

(58) Field of Classification Search
CPC ......... H04W 72/0453; H04W 72/0413; H04W 72/12; H04W 72/1263; H04W 72/1273; H04W 72/254; H04W 28/04; H04W 28/1226; H04W 56/001; H04W 56/0015; H04W 56/002; H04L 1/0014; H04L 1/004; H04L 1/0057; H04L 1/0061; H04L 1/0067; H04L 1/0063; H04L 1/1812; H04L 1/1819; H04L 1/1861; H04L 1/1864

See application file for complete search history.

(56) References Cited

U.S. PATENT DOCUMENTS

| | | | |
|---|---|---|---|
| 2020/0359375 A1* | 11/2020 | Hwang | H04L 1/1854 |
| 2021/0068101 A1* | 3/2021 | Chen | H04L 1/0072 |
| 2021/0204250 A1* | 7/2021 | Ashraf | H04W 72/53 |
| 2021/0400689 A1* | 12/2021 | Wang | H04W 72/20 |
| 2022/0022178 A1* | 1/2022 | Wang | H04W 72/20 |
| 2022/0052822 A1* | 2/2022 | Lin | H04L 5/0094 |
| 2022/0095326 A1* | 3/2022 | Li | H04L 1/1896 |
| 2022/0248387 A1* | 8/2022 | Park | H04W 4/40 |
| 2022/0353846 A1* | 11/2022 | Wang | H04L 1/1861 |
| 2023/0319850 A1* | 10/2023 | Selvanesan | H04W 72/02 370/329 |
| 2023/0361830 A1* | 11/2023 | Liu | H04B 7/0626 |

OTHER PUBLICATIONS

"ETSI TS 138 212 V16.2.0," 3GPP, Jul. 2020 (Jul. 2020).
Huawei, et al., "Sidelink physical layer structure for NR V2X," 3GPP TSG RAN WG1 Meeting #98bis, R1-1910054, Oct. 20, 2019 (Oct. 20, 2019).
Huawei, et al., "Sidelink physical layer structure for NR V2X," 3GPP TSG RAN WG1 Meeting #99, R1-1911882, Nov. 22, 2019 (Nov. 22, 2019).

\* cited by examiner

RANGE EXTENSION FOR Sidelink Control Information (SCI) STAGE 2

FIELD

The present application relates to wireless devices and wireless networks, including devices, circuits, and methods for processing Sidelink Control Information (SCI) payload information to extend the range of communications for SCI Stage 2 data.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

In 5G/New Radio (NR), sidelink communication refers to a channel for communications directly between devices, e.g., user equipment (UEs), i.e., without use of traditional uplink or downlink communication channels. Sidelink data is carried over the Physical Sidelink Shared Channel (PSSCH). Sidelink transmissions may follow a one-to-one (i.e., unicast), or one-to-many (i.e., groupcast or broadcast) scheme, meaning that the data sent over the sidelink may be received by a single UE, multiple UEs that belong to a particular group, or all UEs. As with other shared data channels in NR, there is also an analogous Physical Sidelink Control Channel (PSCCH) that carries the sidelink control information (SCI) message, which contains various information about the PSSCH that allows UEs to decode sidelink information.

The SCI is separated further into two stages (i.e., SCI stage 1 and SCI stage 2) before being transmitted to configure a user device. SCI stage 1 includes the PSSCH resource allocation, priority, resource reservation period, demodulation reference signal (DMRS) pattern, SCI stage 2 format, and other parameters. There is typically a single SCI stage 1 format per resource pool. SCI stage 1 information is carried in the PSCCH.

Depending on which SCI stage 2 format is used (e.g., format A or format B), the SCI stage 2 may include various types of payload information. e.g., HARQ process number, a new data indicator, redundancy version, Source ID, Destination ID, HARQ feedback enabling/disabling indicator, cast type indicator, CSI request, Zone ID, communication range requirement, etc. SCI stage 2 information is carried in the PSSCH.

Aspects disclosed herein relate to devices, circuits, and methods for configuring sidelink communications for a wireless device, comprising: obtaining SCI Stage 2 payload information; attaching and distributing cyclic redundancy check (CRC) information to the payload information; performing encoding and rate matching (RM) on the payload information; scrambling the encoded and rate matched payload information; performing modulation on the scrambled payload information; determining a resource mapping for the modulated payload information, wherein the modulated payload information is aggregated across two or more slots (e.g., using different processing operations for at least two slots); and transmitting the modulated payload information according to the determined resource mapping.

According to other aspects, the encoding comprises a polar encoding operation. According to still other aspects, the rate matching comprises at least one of the following operations: a shortening operation, a puncturing operation, or a repetition operation. According to some such aspects, the same polar encoded and rate matched bits are transmitted in each of the aggregated two or more slots: whereas, in other aspects, different polar encoded and rate matched bits are transmitted over at least two of the aggregated two or more slots. For example, the rate matching may be performed according to at least one of the following schemes: a continuous RM scheme, a reversed RM scheme, or a redundancy version RM scheme.

According to other aspects, the scrambling comprises using a same scrambling sequence (e.g., a Gold sequence) over at least two of the aggregated two or more slots; whereas, in other aspects, the scrambling comprises using a different scrambling sequence (e.g., a Gold sequence initialized with a different value, such as a slot-dependent value) over at least two of the aggregated two or more slots.

According to other aspects, determining the resource mapping for the modulated payload information comprises using a same resource mapping over at least two of the aggregated two or more slots; whereas, in other aspects, determining the resource mapping for the modulated payload information comprises using a different resource mapping (e.g., either a different resource allocation of Physical Sidelink Control Channel (PSCCH) or Physical Sidelink Feedback Channel (PSFCH) resources and/or different resource mapping schemes) over at least two of the aggregated two or more slots.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
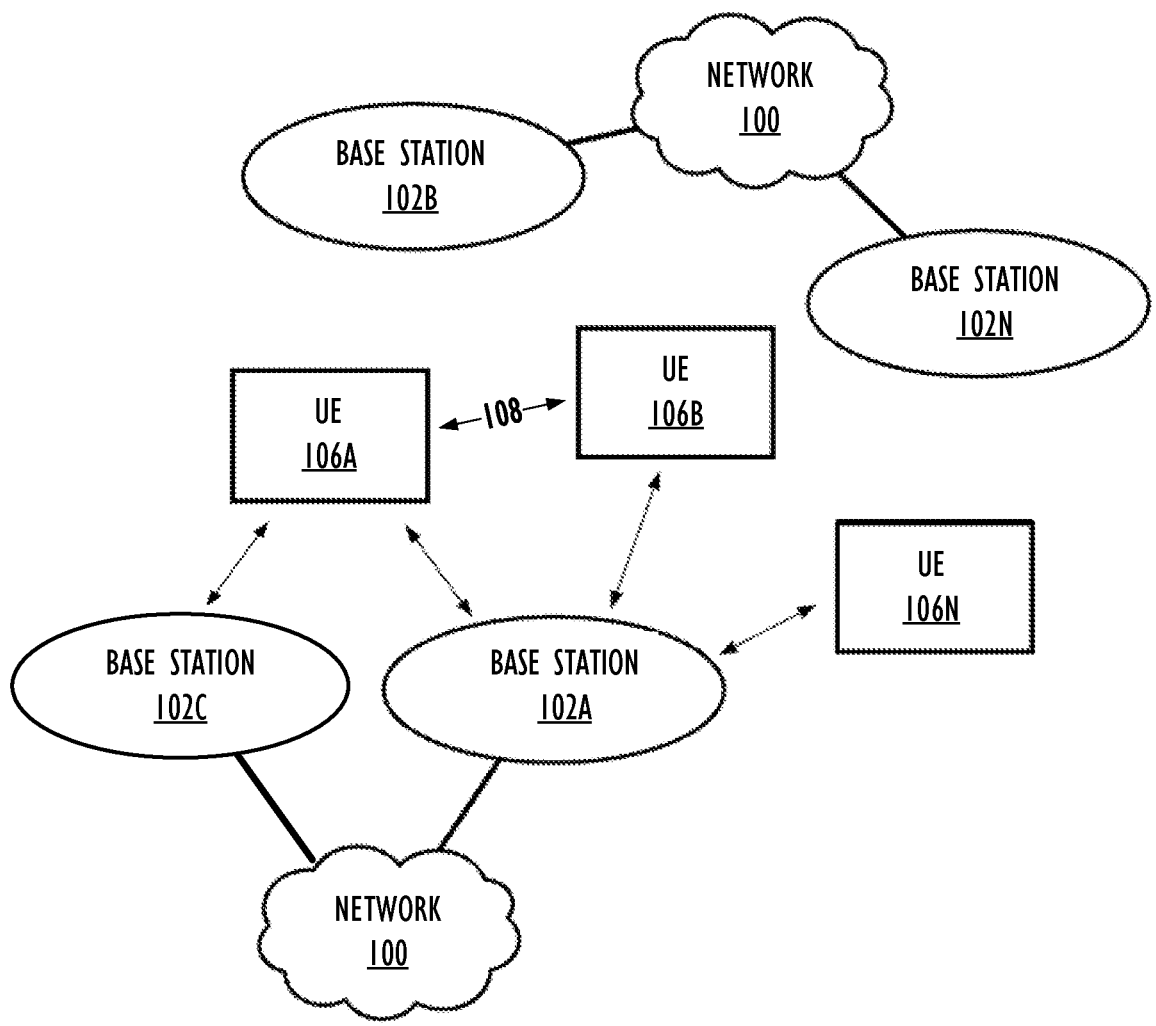
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, it may be desirable for devices to communicate directly to one or more other devices via a sidelink, i.e., without sending information via a base station and traditional uplink and downlink data channels. For example, in 5G/NR, a Vehicle to Everything (V2X) framework has been defined to allow for direct communications between various types of devices on the 5G network using sidelink communications over a PC5 interface. For example, V2X includes the following components: Vehicle 2 Vehicle (V2V) (e.g., to help with collision avoidance, video sharing, and vehicle platooning), Vehicle to Network (V2N) (e.g., to be used for in-vehicle entertainment, vehicle tethering, and general Internet connectivity); Vehicle to Infrastructure (V2I) (e.g., for traffic signal timing, car parking information, and vehicle platooning); and Vehicle to Pedestrian (V2P) (e.g., for dynamic ride sharing applications, safety alerts to pedestrians, pedestrian warnings to vehicles, etc.).

V2V is an example of a variant of device-to-device (D2D) communications that uses the sidelink channel (rather than uplink and downlink data channels) and imposes certain requirements on the sidelink channel, such as support for reliable and low latency communications between devices traveling at high speeds. Before sidelink communications between devices can take place, the devices must be configured via the aforementioned SCI, which is transmitted in both the PSCCH (in the case of SC stage 1 information) and the PSSCH (in the case of SCI stage 2 information).

Because 5G devices (e.g., UEs and/or vehicles) may be moving rapidly and/or located at large distances from other 5G devices (e.g., UEs and/or vehicles), it may be desirable to extend the range over which such devices are able to successfully receive and decode SCI information from other 5G devices, especially SCI stage 2 information. As such, by utilizing slot aggregation and various other slot-dependent processing techniques, such as those described in greater detail herein, the available range for SCI Stage 2 transmissions may effectively be increased. For example, by aggregating just two slots together for SCI Stage 2 transmission (i.e., rather than using a single slot), gains of roughly 3 dB may be experienced by the receiving device.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device, a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term- "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the terms "UE" or "UE device" or "user device" can be broadly defined to encompass any electronic, computing, and/or telecommunications device (or combination of devices) that is easily transported by a user (or vehicle) and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node." or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form but not be involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some aspects, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a Physical Sidelink Shared Channel (PSSCH), a Physical Sidelink Control Channel (PSCCH), a Physical Sidelink Broadcast Channel (PSBCH), and a Physical Sidelink Feedback Channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.
Example User Equipment (UE)

Figure 2:
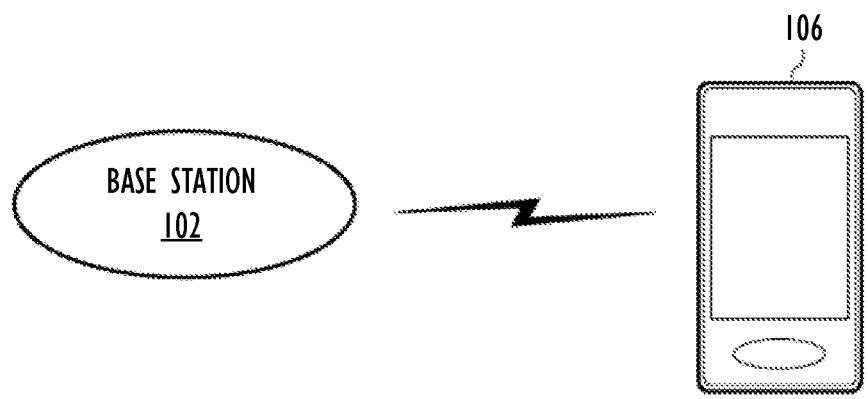
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

In some aspects, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
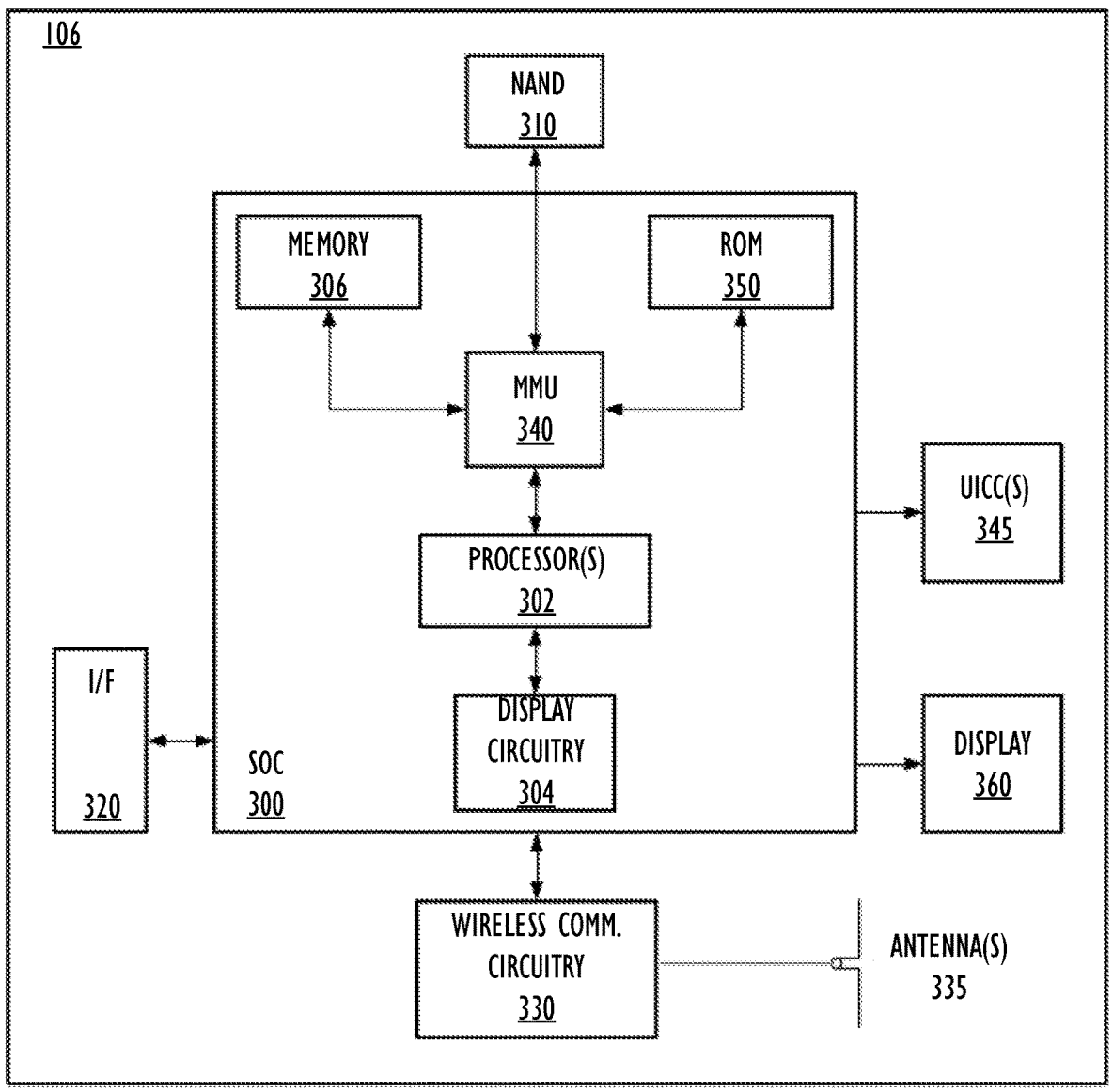
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR. UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively, directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively, directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
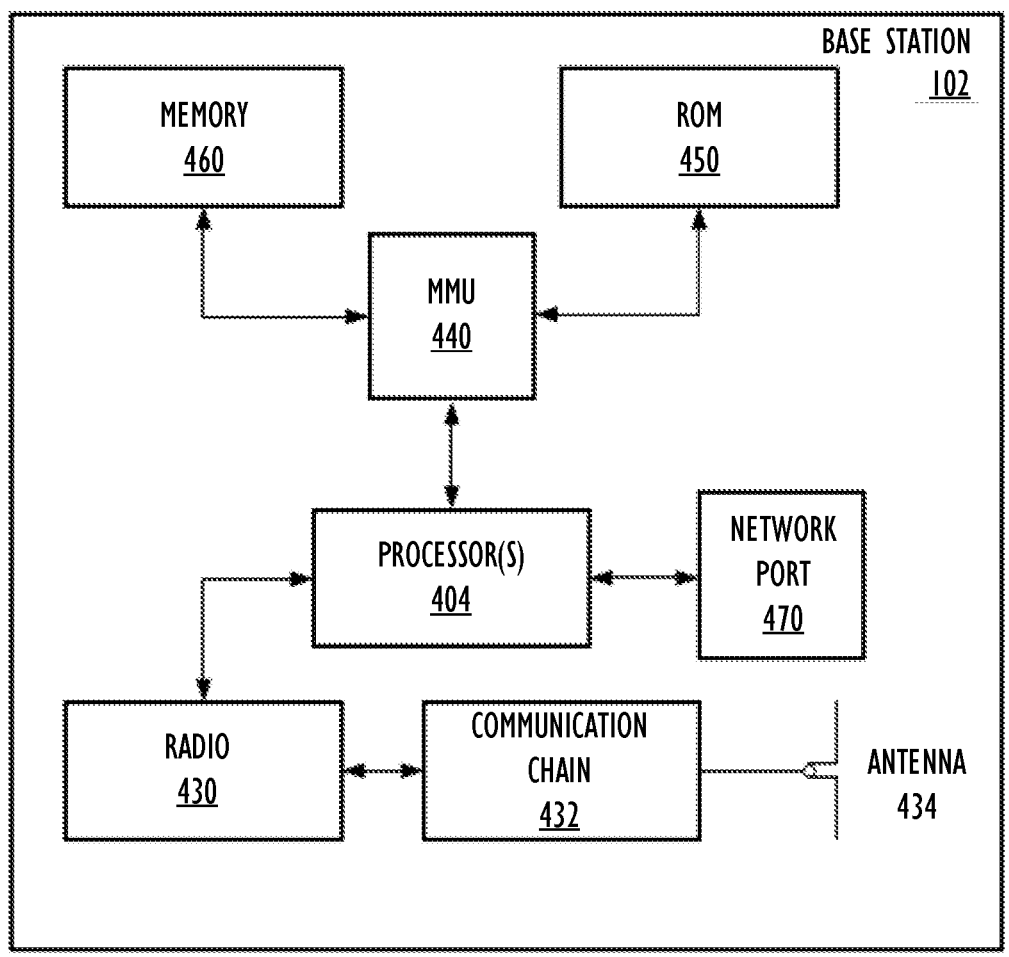
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
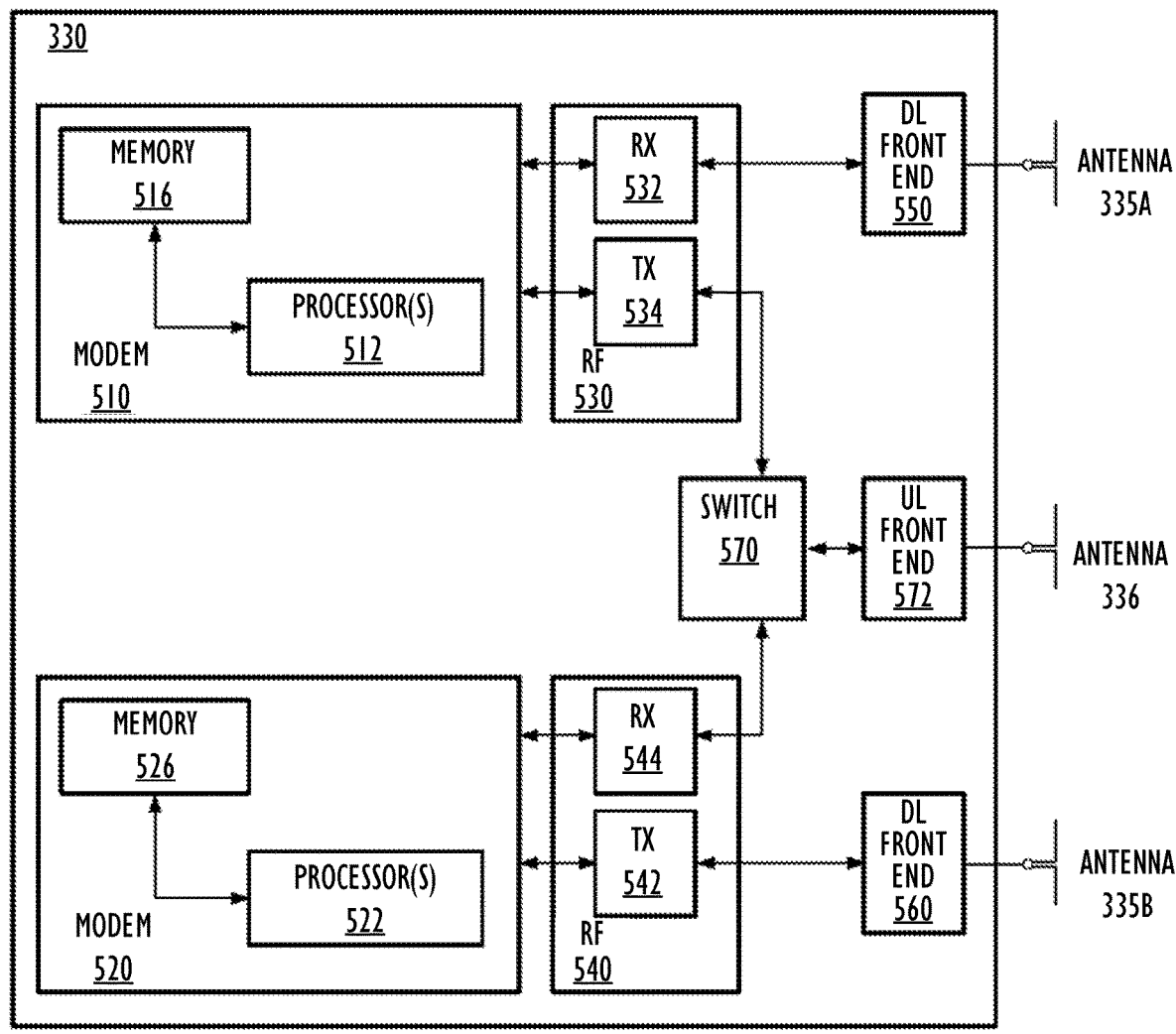
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit, other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively, directly or indirectly) to one or more antennas, such as antennas 335*a-b* and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335*a*.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335*b*.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335*b*. As another example, the cellular communication circuitry 330 may not include the modem 510, the RF front end 530, the DL front end 550, and/or the antenna 335*a*. In some aspects, the cellular communication circuitry 330 may also not include the switch 570, and the RF front end 530 or the RF front end 540 may be in communication. e.g., directly, with the UL front end 572.

Example Network Element

Figure 6:
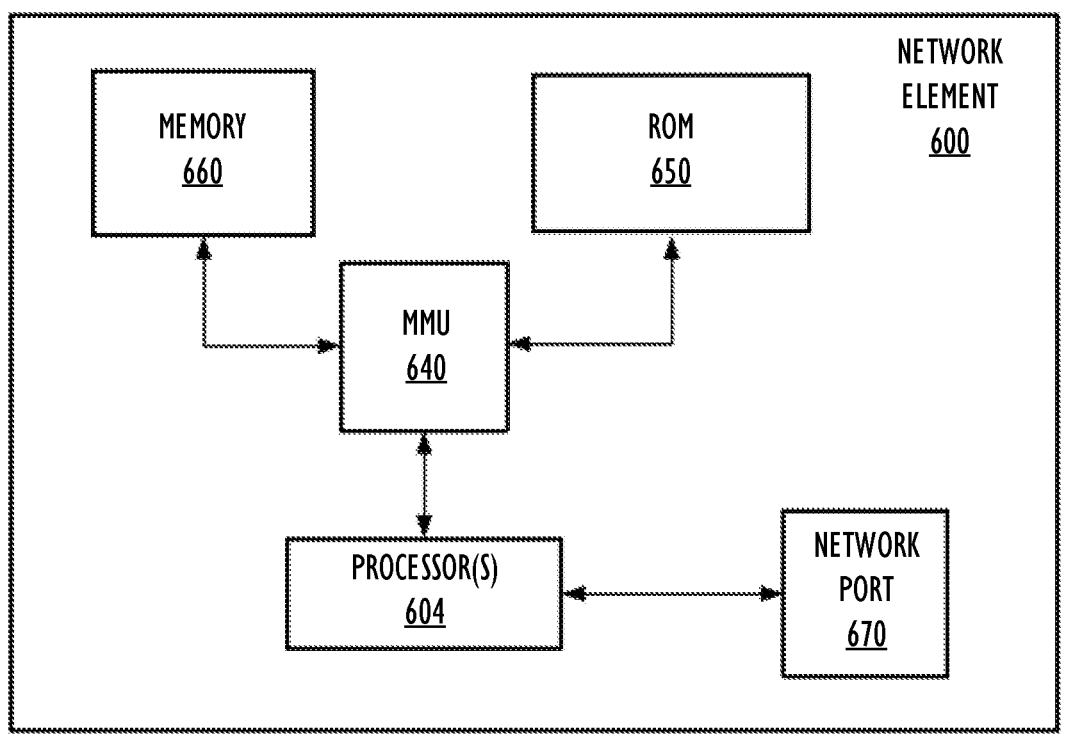
FIG. 6 illustrates an example block diagram of a network element, according to some aspects.

FIG. 6 illustrates an exemplary block diagram of a network element 600, according to some aspects. According to some aspects, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Sidelink Resource Mapping Schemes

Figure 7:
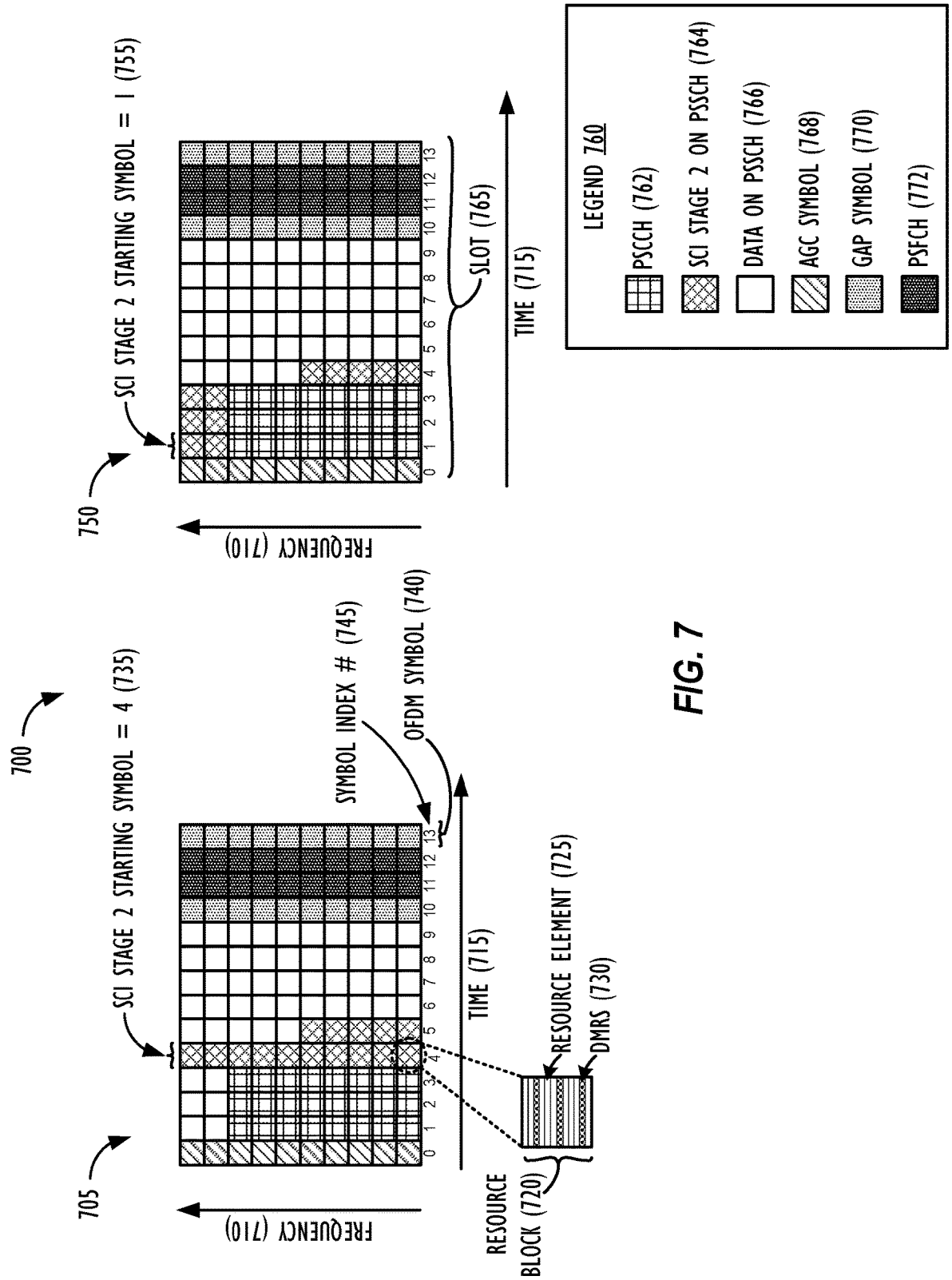
FIG. 7 illustrates exemplary sidelink physical channel resource mapping grids, according to some aspects.

Turning now to FIG. 7, exemplary sidelink physical channel resource mapping grids 700 are illustrated, according to some aspects. As shown in Legend 760: blocks in the resource mapping grids with the shading pattern shown in box 762 correspond to the PSCCH; blocks in the resource mapping grids with the shading pattern shown in box 764 correspond to the SCI stage 2 information on the PSCCH; blocks in the resource mapping grids with the shading pattern shown in box 766 correspond to the transmission of sidelink data on the PSCCH; blocks in the resource mapping grids with the shading pattern shown in box 768 correspond to the Automatic Gain Control (AGC) symbol; blocks in the resource mapping grids with the shading pattern shown in box 770 correspond to the gap symbol; and blocks in the resource mapping grids with the shading pattern shown in box 772 correspond to the PSFCH.

Turning now to exemplary resource mapping grid 705, it is illustrated that the vertical axis 710 corresponds to the frequency domain, while the horizontal axis 715 corresponds to the time domain. This convention will be used throughout the Figures in this application. Each block in the grid 705 represents a resource block (RB) 720, which may be defined as a number, e.g., 12, of contiguous resource elements (REs) 725 carried by subcarriers in the frequency domain. Each column of RBs in grid 705 corresponds to a single orthogonal frequency division multiplexing (OFDM) symbol in the time domain 740. The symbol index numbers (745) are also labeled across the horizontal time axis 715 for illustrative purposes. Although illustrated as a single slot (e.g., slot 765) being comprised of 14 OFDM symbols (740), the NR system may be configured to use different numbers of symbols per slot (e.g., 12), if so desired.

Returning to exemplary resource mapping grid 705, it is illustrated that the entire frequency bandwidth shown in FIG. 7 for the first OFDM symbol (i.e., with symbol index number=0) comprises AGC information. Next the OFDM symbols indexed 1, 2, and 3 carry PSCCH information on the eight lowest-frequency RBs illustrated (while the two highest frequency RBs illustrated in symbols indexed 1, 2, and 3 are reserved for PSSCH data). Next, it is illustrated that the SCI stage 2 data is transmitted on the PSSCH over various RBs in symbols indexed 4 and 5. Finally, in exemplary resource mapping grid 705, it is illustrated that symbol indices 10 and 13 of the slot are reserved as a gap symbol, while symbol indices 11 and 12 of the slot are reserved for the PSFCH. [It is to be understood that the exact size and configuration of RBs in exemplary resource allocation mapping grid 705 (and other resource allocation mapping grids shown in this disclosure) are chosen merely for illustrative purposes, and the do not imply a particular number of RBs, symbols, and/or slots that must be used to effectuate the novel techniques disclosed herein. For example, rather than 8 RBs, the PSCCH could comprise 10 or more RBs in the frequency domain (e.g., possible values for the PSCCH could include 10, 12, 15, 20, 25 RBs, etc.). The sub-channel size could also be expanded, e.g., to comprise 20 (or more) RBs. Furthermore, as will be explained below, certain types of information and/or channels (e.g., the PSFCH feedback channel) may also be optional in a given configuration.]

As illustrated in the blow out of RB 720, each RB may also comprise a certain number of REs that carry so-called DMRS information, as illustrated by the shaded REs 730 in FIG. 7. DMRS may be used to estimate the radio channel conditions for a given UE. According to some aspects, as illustrated at element 735 on resource mapping grid 705, the SCI stage 2 information may be allocated beginning at the first symbol wherein PSSCH DMRS are transmitted, or, in this case, symbol index number 4.

By contrast, turning now to exemplary resource mapping grid 750, it is illustrated at element 755 that the SCI stage 2 information may start at a different symbol, in this case, symbol index number 1, and then fill in the rest of the resource mapping grid according to a particular scheme (e.g., the aforementioned 'frequency first, time second' mapping scheme, starting from the lowest frequency location). Assuming that the exemplary slot shown in resource mapping grid 705 and the exemplary slot shown in resource mapping grid 755 were aggregated for the transmission of SCI stage 2 information to a particular UE (or UEs), it is to be understood that the transmission of multiple sets of SCI stage 2 information (and the use of different resource allocations and/or resource mapping schemes) may allow for the improved receipt of such information (e.g., in terms of improved SNR) at the respective particular UE (or UEs).

SCI Stage 2 Resource Mapping Schemes for PSSCH

Figure 8A:
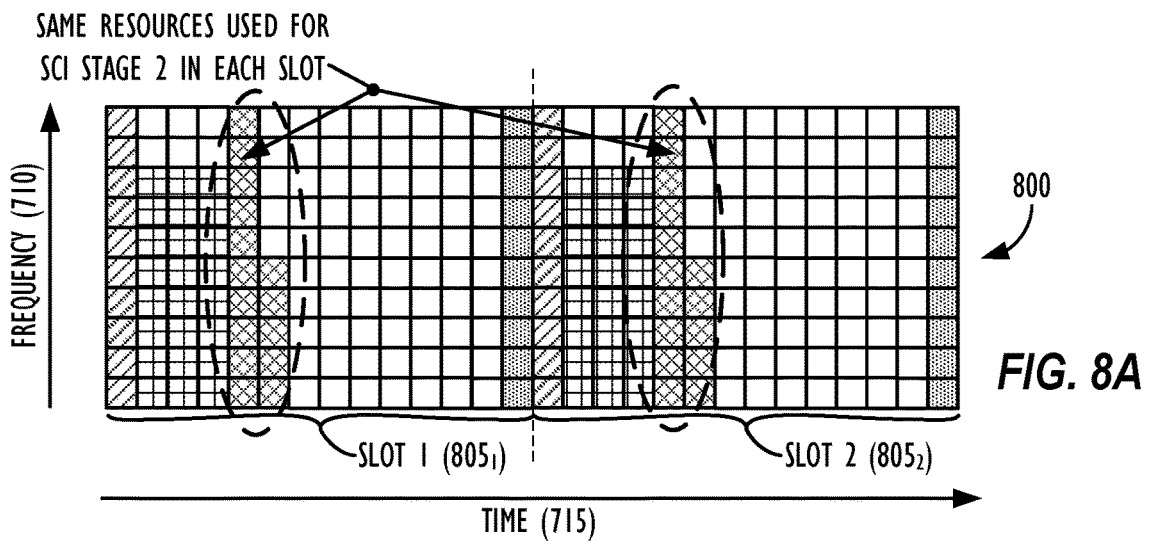
FIGS. 8A-8C illustrate exemplary SCI Stage 2 resource mapping schemes for Physical Sidelink Shared Channel (PSSCH) slot aggregation techniques, according to some aspects.
Figure 8B:
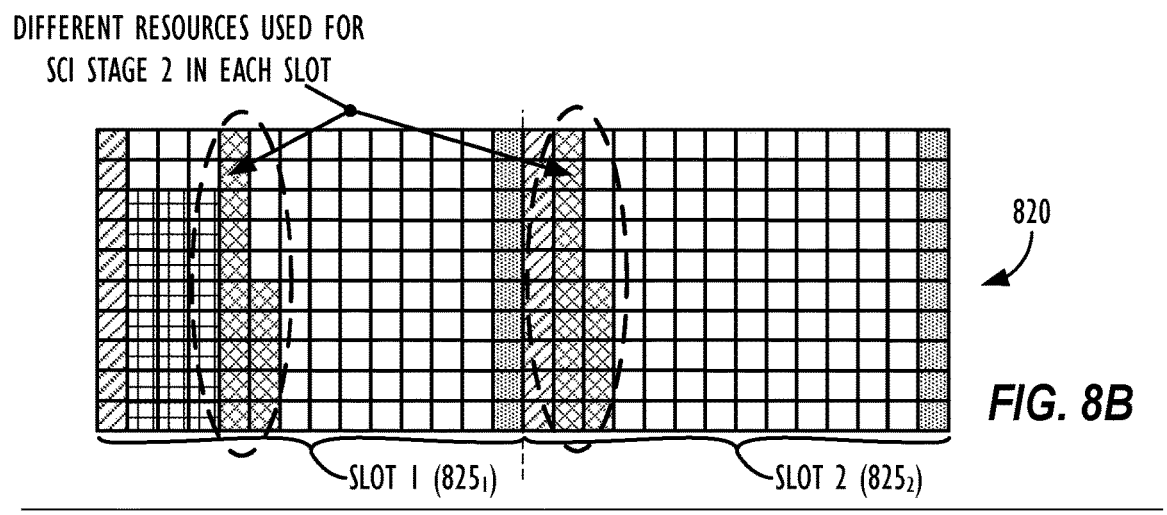
Figure 8C:
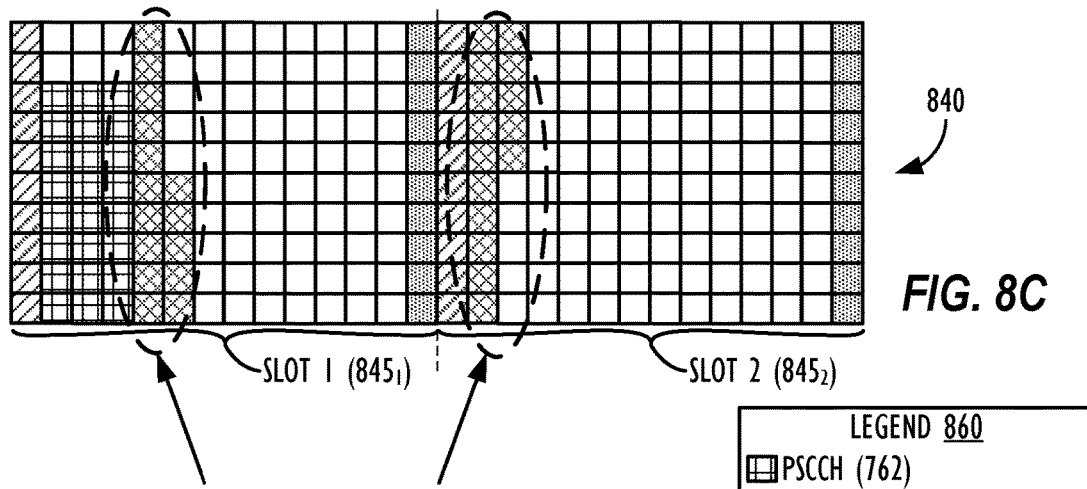

FIGS. 8A-8C illustrate exemplary SCI Stage 2 resource mapping schemes for Physical Sidelink Shared Channel (PSSCH) slot aggregation techniques, according to some aspects. (Legend 860 uses the same block shading scheme as described above with reference to Legend 760 of FIG. 7.)

Turning first to FIG. 8A, exemplary aggregated slots, slot 1 ($805_1$) and slot 2 ($805_2$) are shown, which have a similar structure and allocation scheme to exemplary resource mapping grid 705, described above with reference to FIG. 7, although not showing a PSFCH or a second gap symbol, for ease of illustration (and because such channels and symbols are optionally allocated, depending on the requirements and needs of a given network).

Notably, in aggregated slot example 800 of FIG. 8A, as shown in the dashed line ovals, the same resources are used for the SCI stage 2 information each of slots $805_1$ and $805_2$. Such a configuration may be suitable for cases where the same PSCCH resources are allocated across slots. In addition to utilizing the same resources (i.e., the same set of resource blocks) to carry the SCI stage 2 information, the example 800 of FIG. 8A also uses the same resource mapping scheme (i.e., the aforementioned 'frequency first, time second' mapping scheme, starting from the lowest frequency location).

Turning first to FIG. 8B, exemplary aggregated slots, slot 1 ($825_1$) and slot 2 ($825_2$) are shown. However, in aggregated slot example 820 of FIG. 8B, as shown in the dashed line ovals, different resources are used for the SCI stage 2 information each of slots $825_1$ and $825_2$. Such a configuration may be suitable for cases where different PSCCH (or PSFCH) resources are allocated across slots. Despite utilizing different resources (i.e., different sets of resource blocks) to carry the SCI stage 2 information, the example 820 of FIG. 8B uses the same resource mapping scheme (i.e., the aforementioned 'frequency first, time second' mapping scheme, starting from the lowest frequency location, as shown in example 800 of FIG. 8A).

Turning first to FIG. 8C, exemplary aggregated slots, slot 1 ($845_1$) and slot 2 ($845_2$) are shown. In aggregated slot example 840 of FIG. 8C, as shown in the dashed line ovals, different resources (and different resource mappings) are used for the SCI stage 2 information each of slots $845_1$ and $845_2$. Such a configuration may be suitable for cases where different PSCCH (or PSFCH) resources are allocated across slots. In addition to utilizing different resources (i.e., different sets of resource blocks) to carry the SCI stage 2 information, the example 840 of FIG. 8C also uses different resource mapping schemes (e.g., the aforementioned 'frequency first, time second' mapping scheme, starting from the lowest frequency location, as shown in exemplary slot $845_1$, and a 'frequency first, time second' mapping scheme, starting from the highest frequency location, as shown in exemplary slot $845_2$).

Polar Code Rate Matching Scheme

Figure 9:
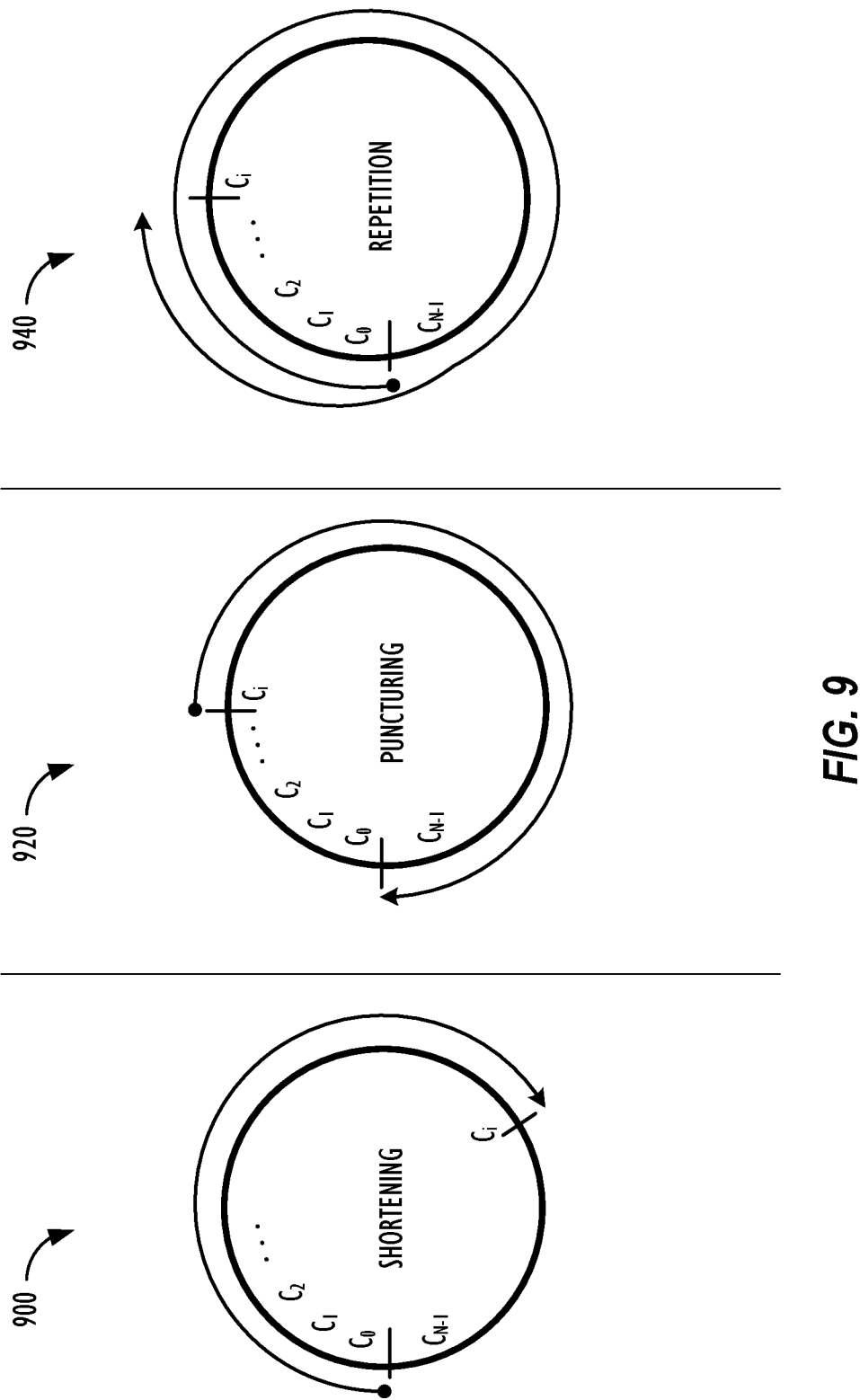
FIG. 9 illustrates exemplary polar code rate matching (RM) operations, according to some aspects.

FIG. 9 illustrates exemplary polar code rate matching (RM) operations, according to some aspects. For example, scheme 900 represents a shortening scheme, wherein the rate matched bits represent a shortened sequence of less than all N bits, e.g., the bits $C_0$ to $C_i$, are selected in exemplary scheme 900. Next, scheme 920 represents a puncturing scheme, wherein the rate matched bits represent a shortened sequence of less than all N bits starting at a location within the string of N bits, e.g., the bits $C_i$ to $C_{N-1}$ are selected in exemplary scheme 920. Finally, scheme 940 represents a repetition scheme, wherein the rate matched bits represent an elongated sequence of greater than all N bits, e.g., starting at location $C_0$ within the string of N bits, rate matching all N bits up to bit $C_{N-1}$, and then continuing on, e.g., selecting the bits up to another location within the bit string, e.g., bit $C_i$, again, as shown in exemplary scheme 940.

Polar Code Rate Matching Schemes for SCI Stage 2

Figure 10A:
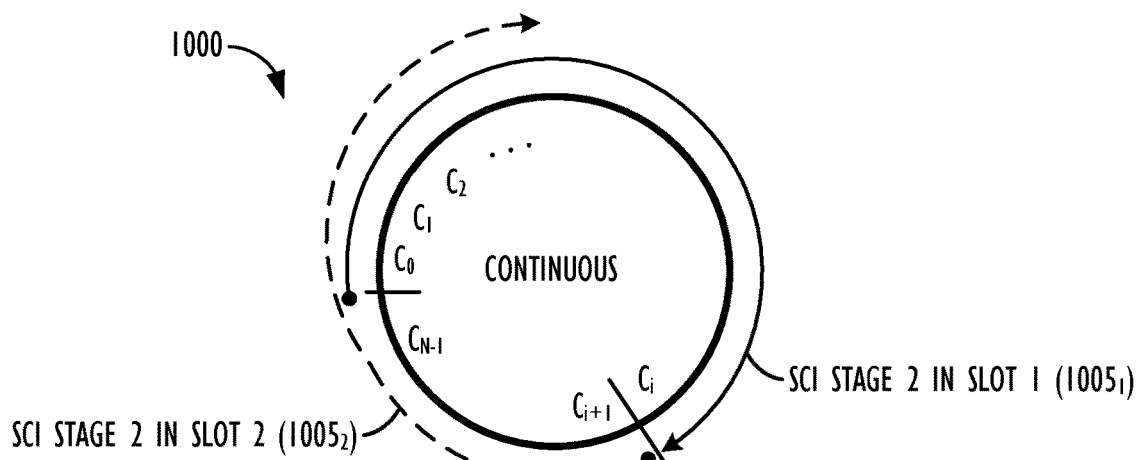
FIGS. 10A-10C illustrate exemplary polar coding and RM operations for SCI Stage 2 slot aggregation techniques, according to some aspects.
Figure 10B:
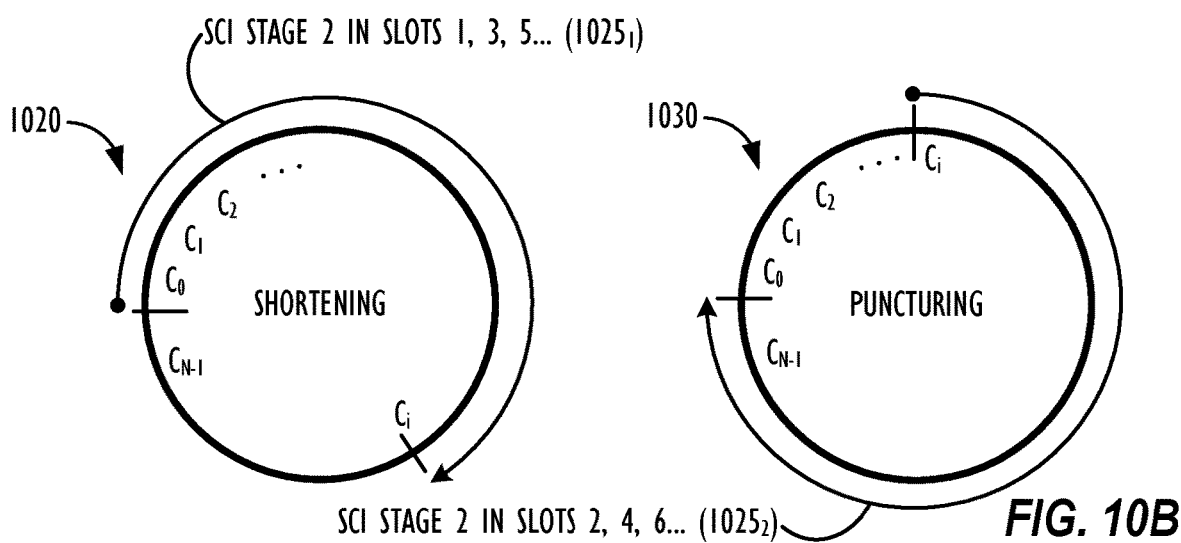
Figure 10C:
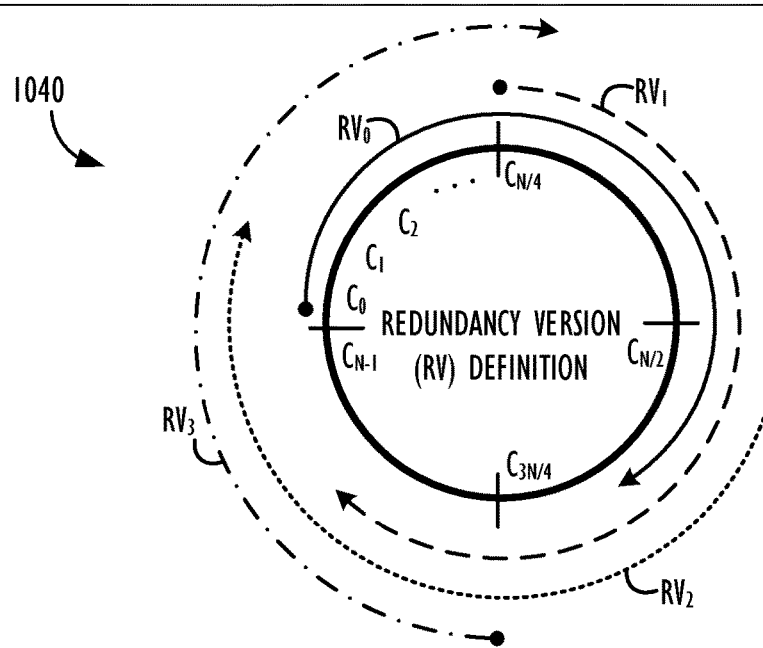

FIGS. 10A-10C illustrate exemplary polar coding and RM operations for SCI Stage 2 slot aggregation techniques, according to some aspects. In some aspects, the determination of which RM scheme to use may depend on one or more of: RM output bit size, payload size, mother code rate and the number of slots used in the particular PSSCH slot aggregation scheme. In some aspects, the RM scheme may simply use the same polar coded and RM output bits for SCI stage 2 over two or more different aggregated slots. In some aspects, the RM scheme may reuse the standard NR Uu polar code rate matching schemes, with the number of RM output bits determined by the resources available in each slot. This type of RM scheme may be used for various resource mapping schemes, such as those shown in FIG. 8A.

In other cases, different polar coded and RM output bits for SCI stage 2 may be used over two or more different aggregated slots. For example, scheme 1000 of FIG. 10A represents a continuous (or repetition-based) RM scheme, wherein the rate matched bits used for the SCI stage 2 information in slot 1 of an exemplary slot aggregation scheme applies a shortening scheme and comprise less than all N bits, e.g., the bits $C_0$ to $C_i$, are selected, as shown by arrow $1005_1$, while the rate matched bits used for the SCI stage 2 information in slot 2 of an exemplary slot aggregation scheme pick up at bit $C_{i+1}$, proceed to the last bit, $C_{N-1}$, then continue on to wrap around the encoded bit sequence circular buffer, returning to $C_0$, until the RM operation is completed, as shown by arrow $1005_2$. This type of RM scheme may be used for various resource mapping schemes, such as those shown in FIGS. 8B and 8C.

In another example, schemes 1020/1030 of FIG. 10B represent a reversed RM output bit selection scheme. For example, a combination of shortening and puncturing RM schemes are used, wherein the coded bits used for the SCI stage 2 information in slot 1 of an exemplary slot aggregation scheme applies a shortening scheme (1020) and comprise less than all N bits, e.g., wherein the bits $C_0$ to $C_i$, are selected, as shown by arrow $1025_1$. Then, the coded bits used for the SCI stage 2 information in slot 2 of the exemplary slot aggregation scheme apply a puncturing scheme (1030), e.g., starting at bit $C_i$ and proceeding to the last bit, $C_{N+1}$, as shown by arrow $1025_2$. In some aspects, the shortening scheme 1020 and puncturing schemes 1030 may be used in different slots, e.g., in alternating slots. For example, SCI stage 2 in a first slot may apply the shortening scheme; SCI stage 2 in a second slot may apply the puncturing scheme; SCI stage 2 in a third slot may again apply the shortening scheme; and SCI stage 2 in a fourth slot may again apply the puncturing scheme, and so forth, in an alternating pattern by slot. In some aspects, the RM scheme selection for the first slot may depend on the SCI stage 2 format (e.g., based on the payload size) and/or the β value selected (i.e., the rate matching output size, as described in ETSI TS 138 212 V16.2.0 (2020 July), e.g., at Section 8.4.4, which is hereby incorporated by reference). This type of RM scheme may be used for various resource mapping schemes, such as those shown in FIGS. 8B and 8C.

In another example, scheme 1040 of FIG. 10C represents a redundancy version (RV) definition RM scheme, wherein different shortening and/or puncturing schemes, as well as different starting positions and/or bit lengths, may be used, depending on the particular slot index, the payload size and/or the rate matching output size. In some aspects, the starting position of each RV may be (pre)defined and/or (pre)configured. For example, as illustrated in scheme 1040: a first RV, $RV_0$, may start at bit $C_0$ and proceed for a predetermined number of bits; a second RV, $RV_1$, may start at bit $C_{N/4}$ and proceed for a predetermined number of bits; a third RV, $RV_2$, may start at bit $C_{N/2}$ and proceed for a predetermined number of bits; and a fourth RV, $RV_3$, may start at bit $C_{3N/4}$ and proceed for a predetermined number of bits. In some aspects, the RV sequence may be (pre)configured or dynamically indicated in SCI stage 1. In other aspects, the RV sequence may be associated with the aggregation level itself, e.g., a slot aggregation level of 2 may correspond to using only $RV_0$ and $RV_2$, while a slot aggregation level of 4 may correspond to using each of $RV_0$, $RV_1$, $RV_2$, and $RV_3$, e.g., in consecutive (and, if necessary, repeated) order for each successive slot that is part of the aggregation scheme. In other aspects, the RV sequence may be determined based on the SCI stage 2 format (e.g., based on payload size and/or the rate matching output size, as set by the aforementioned β value). This type of RM scheme may be used for various resource mapping schemes, such as those shown in FIGS. 8B and 8C.

Figure 11A:
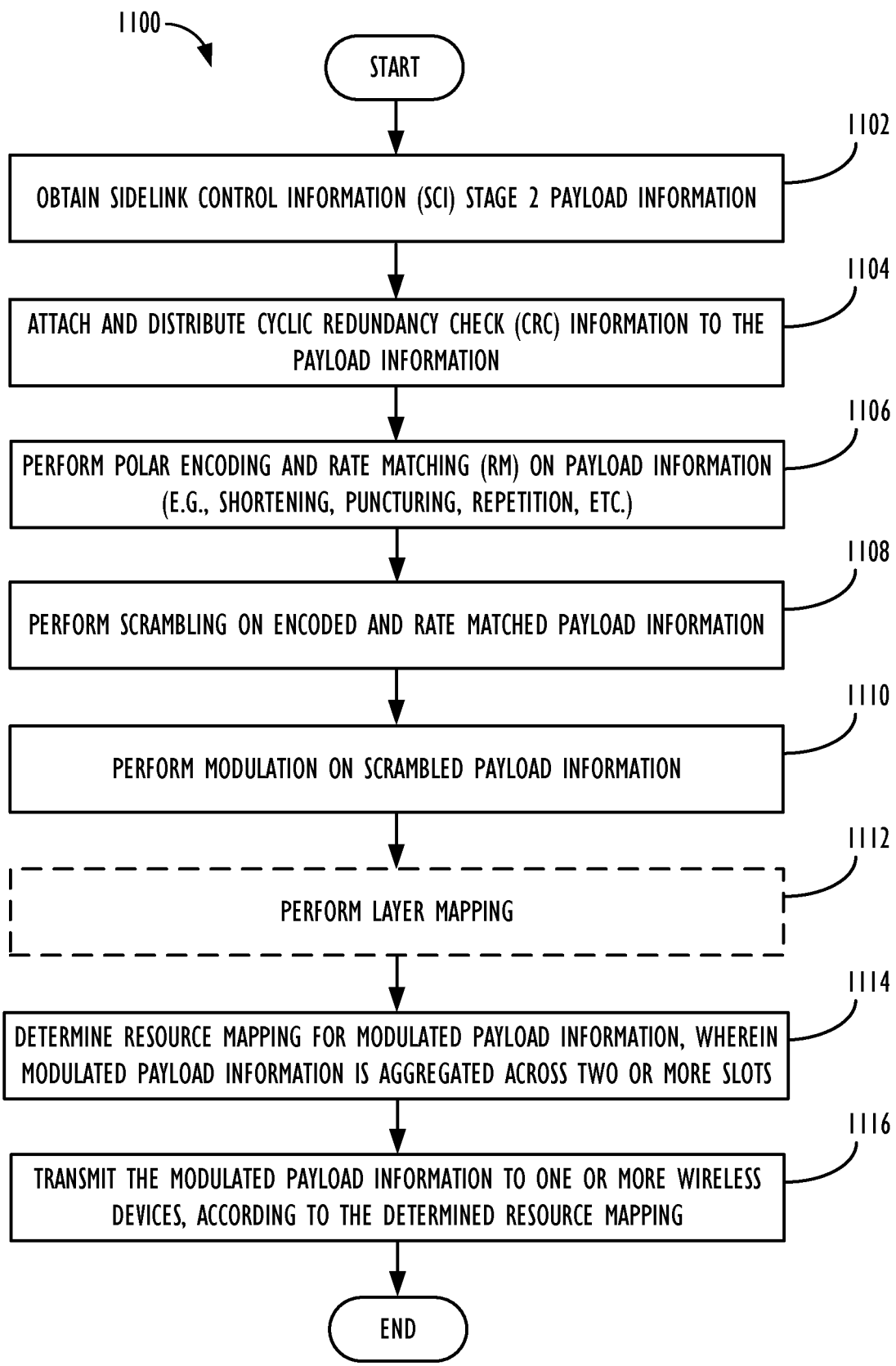
FIGS. 11A-11D illustrate flowcharts detailing various exemplary methods of performing SCI Stage 2 information processing using slot aggregation techniques, according to some aspects.

Exemplary Methods of Performing SCI Stage 2 Information Processing Using Slot Aggregation Techniques FIGS. 11A-11D illustrate flowcharts detailing various exemplary methods of performing SCI Stage 2 information processing using slot aggregation techniques, according to some aspects. Turning first to FIG. 11A, a method 1100 is illustrated for processing SCI Stage 2 information. First, at Step 1102, the method 1100 may obtain sidelink control information (SCI) stage 2 payload information (e.g., this method 1100 may be carried out by or at an exemplary UE device). As mentioned above, depending on which SCI stage 2 format is used (e.g., format A or format B), the SCI stage 2 may include various types of payload information, e.g., HARQ process number, a new data indicator, redundancy version, Source ID, Destination ID, HARQ feedback enabling/disabling indicator, cast type indicator, CSI request, Zone ID, and/or communication range requirement, etc.

Next, at Step 1104, the method 1100 may attach and distribute cyclic redundancy check (CRC) information to the SCI stage 2 payload information. In some aspects, a 24-bit distributed CRC value may be used, as in PDCCH polar coding. In other aspects, no CRC mask may be used.

Next, at Step 1106, the method 1100 may perform polar encoding (e.g., PDCCH polar encoding) and rate matching (RM) on the payload information. Various RM schemes may be employed, e.g., as described above with reference to FIG. 9 and FIGS. 10A-10C. For example, the polar code RM schemes may comprise one or more of the following schemes: shortening, puncturing, or repetition. According to some aspects, the mother code length may be limited by an upper bound of bits, e.g., 128, 256, or 512 bits. According to some aspects, the RM schemes may also include sub-block interleaving, bit selection, and/or channel interleaving. According to other aspects, the triangular channel interleaving techniques for Uplink Control Information (UCI) polar coding may be used. Further, the number of rate matching output bits may be limited (e.g., to 2048 or 4096 bits, etc.).

Next, at Step 1108, the method 1100 may perform scrambling (e.g., in the form of a binary XOR operation) on the encoded and rate matched payload information. According to some aspects, the scrambling of the SCI stage 2 payload information may be performed separately from the sidelink data (unlike UCI on the PUSCH). According to other aspects, the scrambling operation may be performed using a Gold sequence with an initialization value, $c_{init}$, defined as $c_{init}=N_{ID} \cdot 2^{15}+1010$, wherein $N_{ID}$) is the 16 Least significant bits (LSBs) of the PSCCH CRC value, and the multiplication with $2^{15}$ performs a shift 15 bits towards the left. The value of 1010 is an offset specified by the standard, so as to avoid interference with the Uu link.

Next, at Step 1110, the method 1100 may perform modulation on scrambled payload information. According to some aspects, quadrature phase shift keying (QPSK) modulation may be used, although other modulation schemes are also possible.

Next, at Step 1112, the method 1100 may optionally perform layer mapping operations. According to some aspects, up to 2 layers may be used (e.g., as in PSSCH). If the PSSCH is 2-layered, the same modulation symbols may be used on each the two layers (e.g., including using the same resource mapping), while different antenna ports are used for the transmission of each layer.

Next, at Step 1114, the method 1100 may determine resource mappings for the modulated payload information, wherein the modulated payload information is aggregated across two or more slots. As illustrated above with reference to FIGS. 8A-8C, various resource mapping schemes are possible, and may be chosen on a per-slot basis. e.g., based on how many slots are being aggregated in the SCI stage 2 transmission. According to some aspects, the first symbol with a given slot used for SCI stage 2 information may be the first PSSCH symbol containing DMRS information. In other aspects, a 'frequency-first, time-second' mapping may be used. In some aspects, the resource mapping for SCI stage 2 information may begin at the lowest frequency location and proceed to higher frequency ranges, while, in other aspects, the resource mapping for SCI stage 2 information may begin at the highest frequency location and proceed to lower frequency ranges. In some aspects, for the last SCI stage 2 symbol, localized RE mapping (i.e., the use of contiguous REs in the frequency domain for the last SCI stage 2 OFDM symbol) may be performed, with granularity at the resource block-level.

Signaling related to the PSSCH slot aggregation scheme to be used may be transmitted in various ways. For example, it may be dynamically indicated in SCI stage 1 information (e.g., from preconfigured slot aggregation levels, such as 1, 2, 4, 8, etc.), set as part of a resource pool (pre)configuration, and/or signaled via PC5-RRC configuration.

Signaling related to the determination of how many resource elements to use for SCI stage 2 information may also follow different approaches. For example, in a first aspect, the same set of possible β values may be used as in the "non-aggregated" PSSCH slots case (i.e., which play a role in determining the number of REs used for SCI stage 2 information in a single slot). While, in a second aspect, different sets of possible β values may be used than in the "non-aggregated" PSSCH slots case. For example, in some such aspects, the number of REs used for SCI stage 2 information in a single slot may be proportional to PSSCH aggregation level and/or may change, e.g., drop off or increase, in number, over successive slots in the slot aggregation.

Finally, at Step 1116, the method 1100 may transmit the modulated payload information to one or more wireless devices (e.g., UEs), according to the determined resource mapping.

Figure 11B:
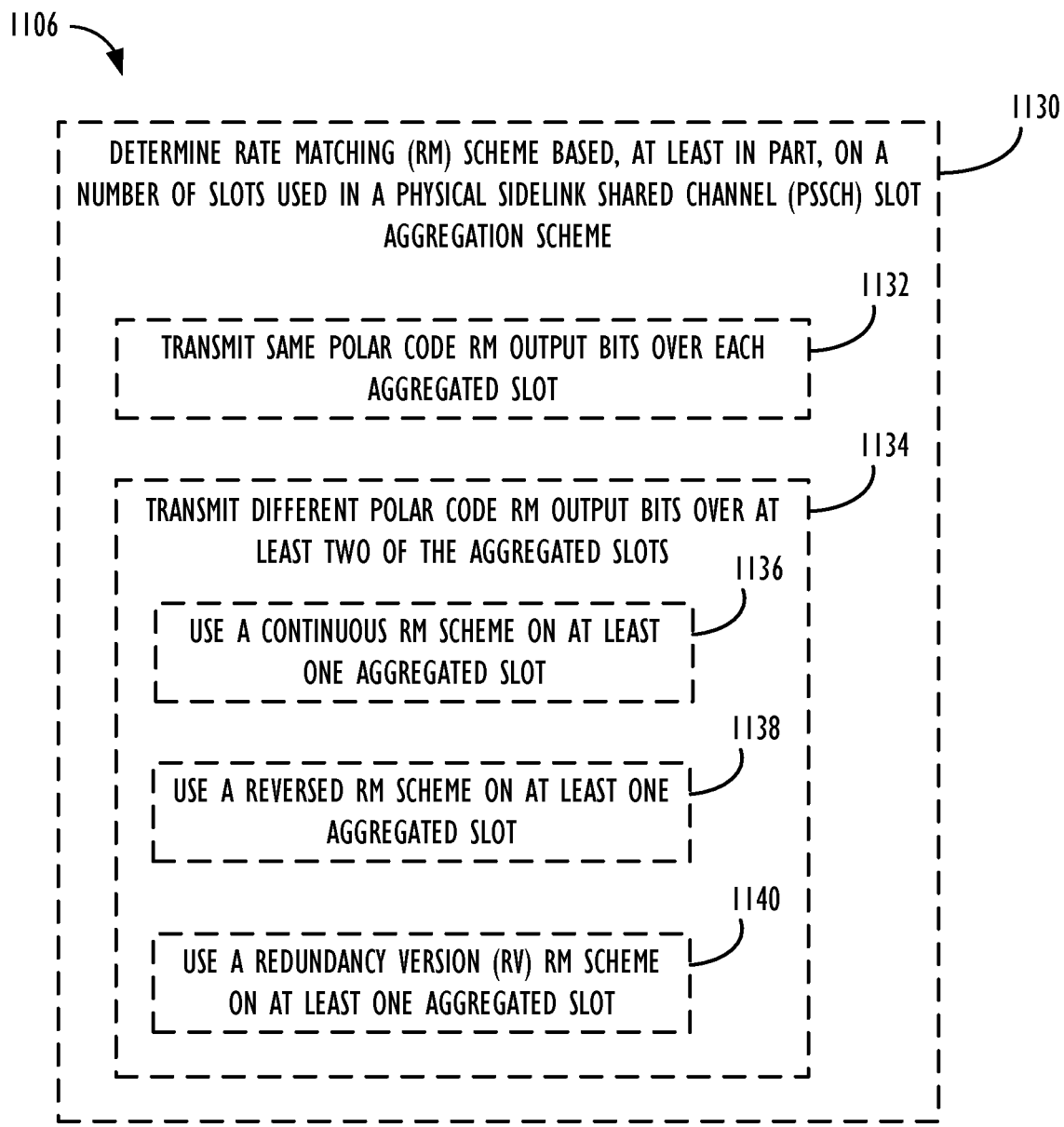

Turning now to FIG. 11B, a flowchart providing extra details to Step 1106 of method 1100 is illustrated. At Step 1130, it is further clarified that, at Step 1106, the method 1100 may determine the rate matching (RM) scheme to be used based, at least in part, on a number of slots used in a physical sidelink shared channel (PSSCH) slot aggregation scheme. For example, according to some aspects, the method 1100 may transmit the same polar coded and RM output bits over each aggregated slot, no matter how many slots are aggregated (Step 1132). According to other aspects, to provide greater diversity of coverage, the method 1100 may transmit different polar coded and RM output bits over at least two of the aggregated slots (Step 1134). For example, on at least one of the aggregated slots, the method may use at least one of: a continuous RM scheme, as illustrated in FIG. 10A (Step 1136); a reversed RM scheme, as illustrated in FIG. 10B (Step 1138); or a redundancy version (RV) RM scheme, as illustrated in FIG. 10C (Step 1140).

Figure 11C:
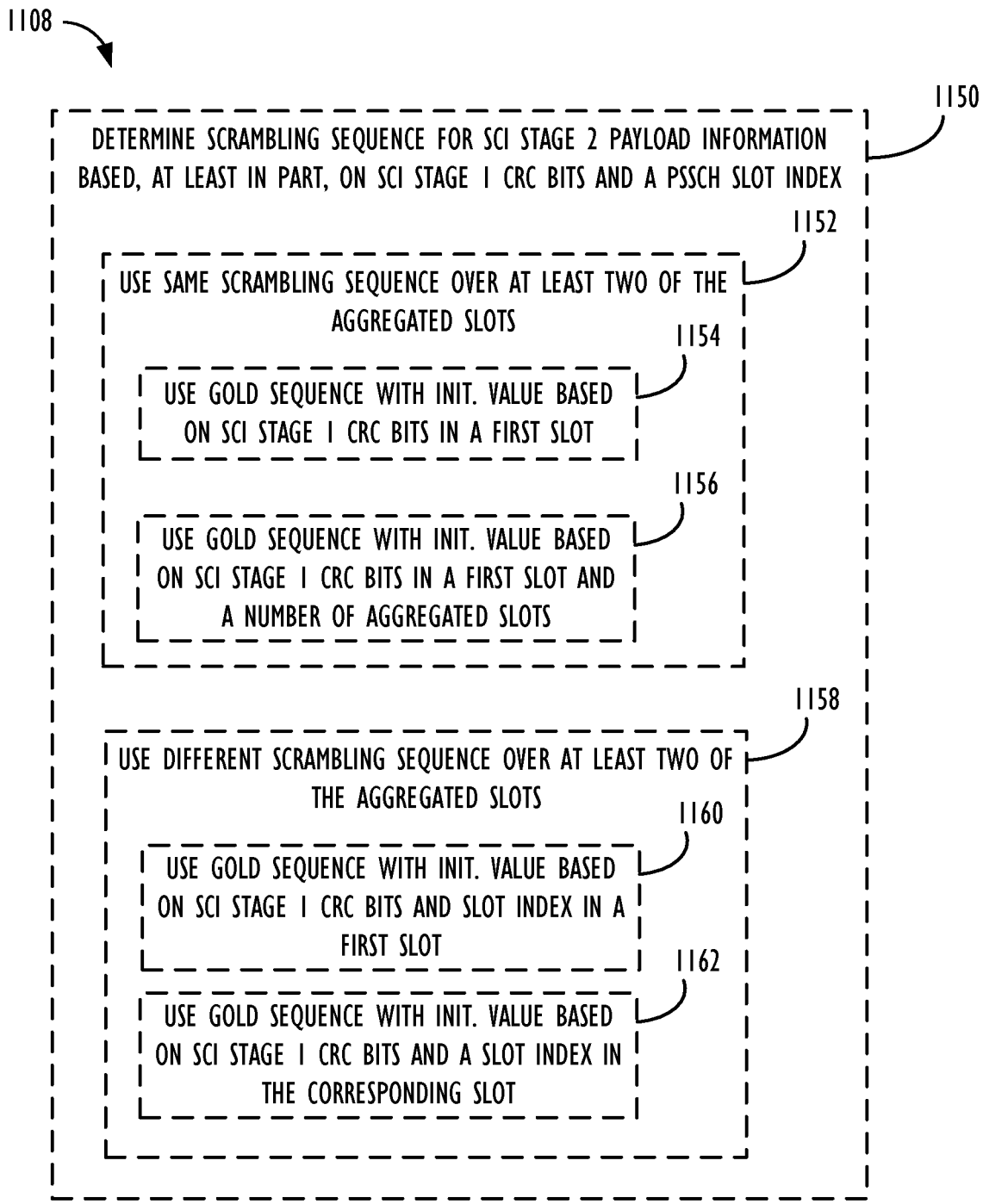

Turning now to FIG. 11C, a flowchart providing extra details to Step 1108 of method 1100 is illustrated. At Step 1150, it is further clarified that, at Step 1108, the method 1100 may determine the scrambling sequence for the SCI stage 2 payload information based, at least in part, on the SCI stage 1 CRC bits and a PSSCH slot index. For example, according to some aspects, the method 1100 may use the same scrambling sequence over at least two (and, preferably, all) of the aggregated slots (Step 1152). In one example, the method 1100 may use a Gold sequence with an initialization value based on SC stage 1 CRC bits in a first slot (Step 1154). In another example, the method 1100 may use a Gold sequence with an initialization value based on SCI stage 1 CRC bits in a first slot and a number of other aggregated slots (Step 1156).

According to other aspects, the method 1100 may use a different scrambling sequence over at least two of the aggregated slots (Step 1158). In one example, the method 1100 may use a Gold sequence with an initialization value based on SCI stage 1 CRC bits and a slot index number in a first slot (Step 1160). In another example, the method 1100 may use a Gold sequence with an initialization value based on SCI stage 1 CRC bits and a slot index in the corresponding slot (Step 1162).

Figure 11D:
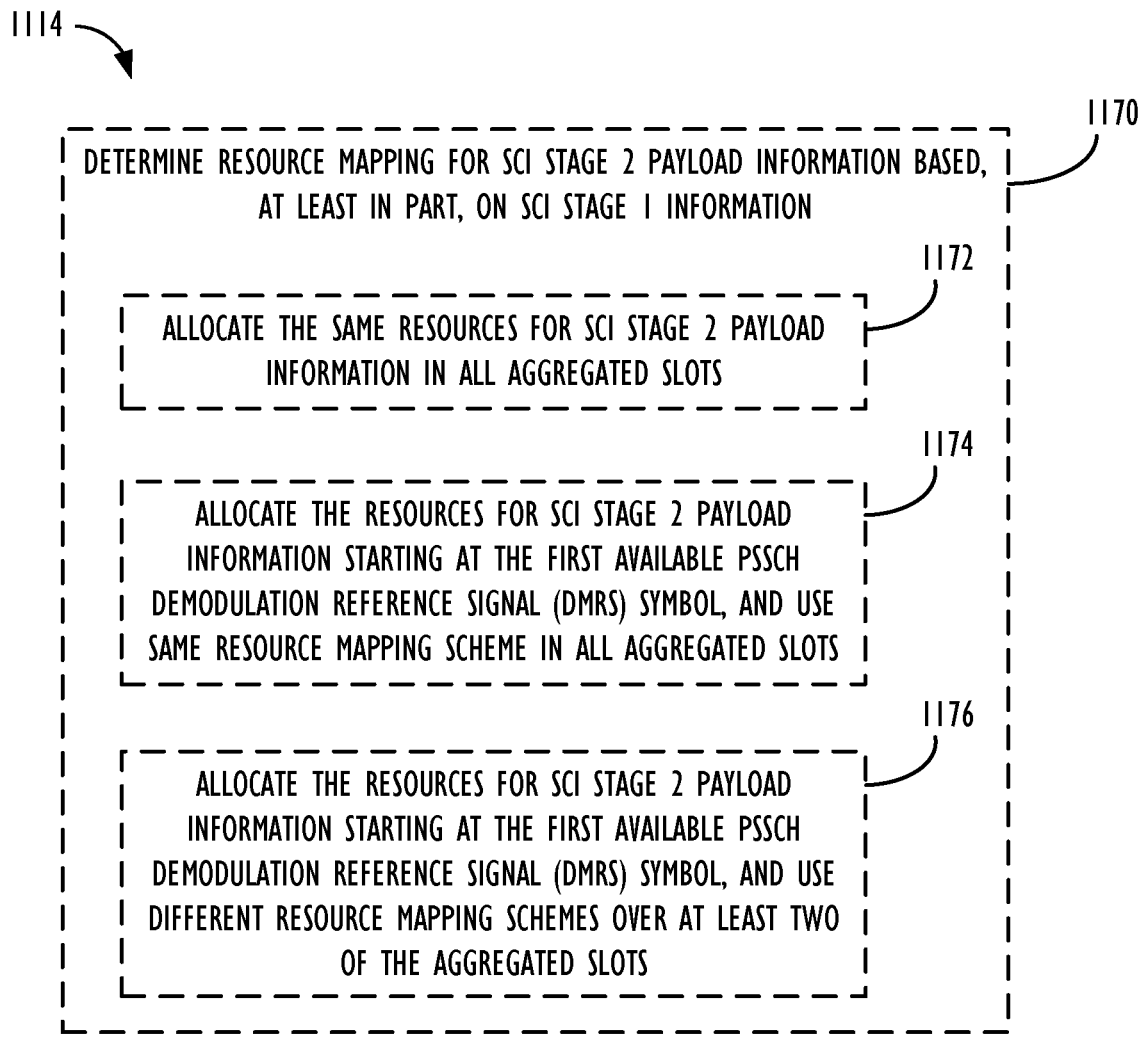

Turning now to FIG. 11D, a flowchart providing extra details to Step 1114 of method 1100 is illustrated. At Step 1170, it is further clarified that, at Step 1114, the method 1100 may determine resource mapping for SCI stage 2 payload information based, at least in part, on the SCI stage 1 information. For example, according to a first aspect, the method 1100 may allocate the same resources for SCI stage 2 payload information in all aggregated slots (Step 1172). According to a second aspect, the method 1100 may allocate the resources for SCI stage 2 payload information starting at the first available PSSCH demodulation reference signal (DMRS) symbol and use same resource mapping scheme in all aggregated slots (Step 1174). According to a third aspect, the method 1100 may allocate the resources for SCI stage 2 payload information starting at the first available PSSCH DMRS symbol, but use different resource mapping schemes over at least two of the aggregated slots (e.g., one slot mapping SCI stage 2 information beginning at the highest frequency subcarrier available, and another slot mapping SCI stage 2 information beginning at the lowest frequency subcarrier available) (Step 1176).

Examples

In the following sections, further exemplary aspects are provided.

According to Example 1, a method for configuring communications for a wireless device is disclosed, comprising: obtaining sidelink control information (SCI) Stage 2 payload information; attaching and distributing cyclic redundancy check (CRC) information to the payload information; performing encoding and rate matching (RM) on the payload information; scrambling the encoded and rate matched payload information; performing modulation on the scrambled payload information; determining a resource mapping for the modulated payload information, wherein the modulated payload information is aggregated across two or more slots; and transmitting the modulated payload information to one or more wireless devices, according to the determined resource mapping.

Example 2 comprises the subject matter of example 1, wherein the encoding comprises a polar encoding operation.

Example 3 comprises the subject matter of example 2, wherein the rate matching comprises at least one of the following operations: a shortening operation, a puncturing operation, or a repetition operation.

Example 4 comprises the subject matter of example 3, wherein same polar encoded and rate matched bits are transmitted in each of the aggregated two or more slots.

Example 5 comprises the subject matter of example 3, wherein different polar encoded and rate matched bits are transmitted over at least two of the aggregated two or more slots.

Example 6 comprises the subject matter of example 5, wherein the rate matching is performed according to one of the following schemes: a continuous RM scheme, a reversed RM scheme, or a redundancy version RM scheme.

Example 7 comprises the subject matter of example 1, wherein the scrambling comprises using a same scrambling sequence over at least two of the aggregated two or more slots.

Example 8 comprises the subject matter of example 1, wherein the scrambling comprises using a different scrambling sequence over at least two of the aggregated two or more slots.

Example 9 comprises the subject matter of example 1, wherein determining the resource mapping for the modulated payload information comprises using a same resource mapping over at least two of the aggregated two or more slots.

Example 10 comprises the subject matter of example 1, wherein determining the resource mapping for the modulated payload information comprises using a different resource mapping over at least two of the aggregated two or more slots.

According to Example 11, a wireless device is disclosed, comprising: a radio; and a processor operably coupled to the radio, wherein the wireless station is configured to: obtain sidelink control information (SCI) Stage 2 payload information; attach and distribute cyclic redundancy check (CRC) information to the payload information; perform encoding and rate matching (RM) on the payload information; scramble the encoded and rate matched payload information; perform modulation on the scrambled payload information: determine a resource mapping for the modulated payload information, wherein the modulated payload information is aggregated across two or more slots; and transmit the modulated payload information to one or more wireless devices, according to the determined resource mapping.

Example 12 comprises the subject matter of example 11, wherein the encoding comprises a polar encoding operation.

Example 13 comprises the subject matter of example 12, wherein the rate matching comprises at least one of the following operations: a shortening operation, a puncturing operation, or a repetition operation.

Example 14 comprises the subject matter of example 13, wherein same polar encoded and rate matched bits are transmitted in each of the aggregated two or more slots.

Example 15 comprises the subject matter of example 13, wherein different polar encoded and rate matched bits are transmitted over at least two of the aggregated two or more slots.

Example 16 comprises the subject matter of example 15, wherein the rate matching is performed according to one of the following schemes: a continuous RM scheme, a reversed RM scheme, or a redundancy version RM scheme.

Example 17 comprises the subject matter of example 11, wherein the scrambling comprises using a same scrambling sequence over at least two of the aggregated two or more slots.

Example 18 comprises the subject matter of example 11, wherein the scrambling comprises using a different scrambling sequence over at least two of the aggregated two or more slots.

Example 19 comprises the subject matter of example 11, wherein determining the resource mapping for the modulated payload information comprises using a same resource mapping over at least two of the aggregated two or more slots.

Example 20 comprises the subject matter of example 11, wherein determining the resource mapping for the modulated payload information comprises using a different resource mapping over at least two of the aggregated two or more slots.

According to example 21, an integrated circuit is disclosed, comprising circuitry configured to cause a wireless device to: obtain sidelink control information (SCI) Stage 2 payload information; attach and distribute cyclic redundancy check (CRC) information to the payload information; perform encoding and rate matching (RM) on the payload information; scramble the encoded and rate matched payload information; perform modulation on the scrambled payload information; determine a resource mapping for the modulated payload information, wherein the modulated payload information is aggregated across two or more slots; and transmit the modulated payload information to one or more wireless devices, according to the determined resource mapping.

Example 22 comprises the subject matter of example 21, wherein the encoding comprises a polar encoding operation.

Example 23 comprises the subject matter of example 22, wherein the rate matching comprises at least one of the following operations: a shortening operation, a puncturing operation, or a repetition operation.

Example 24 comprises the subject matter of example 23, wherein same polar encoded and rate matched bits are transmitted in each of the aggregated two or more slots.

Example 25 comprises the subject matter of example 23, wherein different polar encoded and rate matched bits are transmitted over at least two of the aggregated two or more slots.

Example 26 comprises the subject matter of example 25, wherein the rate matching is performed according to one of the following schemes: a continuous RM scheme, a reversed RM scheme, or a redundancy version RM scheme.

Example 27 comprises the subject matter of example 21, wherein the scrambling comprises using a same scrambling sequence over at least two of the aggregated two or more slots.

Example 28 comprises the subject matter of example 21, wherein the scrambling comprises using a different scrambling sequence over at least two of the aggregated two or more slots.

Example 29 comprises the subject matter of example 21, wherein determining the resource mapping for the modulated payload information comprises using a same resource mapping over at least two of the aggregated two or more slots.

Example 30 comprises the subject matter of example 21, wherein determining the resource mapping for the modulated payload information comprises using a different resource mapping over at least two of the aggregated two or more slots.

Yet another exemplary aspect may include a method, comprising, by a device, performing any or all parts of the preceding examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding examples.

Yet another exemplary aspect may include an apparatus comprising means for performing any or all of the elements of any of the preceding examples.

Still another exemplary aspect may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. A method for configuring communications for a wireless device, comprising:
    obtaining sidelink control information (SCI) Stage 2 payload information;
    determining a resource mapping for the SCI Stage 2 payload information to a Physical Sidelink Shared Channel (PSSCH), wherein the SCI Stage 2 payload information is aggregated across two or more slots of the PSSCH, and wherein a number of resource elements (REs) used for the SCI Stage 2 payload information in a single slot is proportional to a PSSCH slot aggregation level used and a number of RE changes over successive slots for a transmission of the SCI Stage 2 payload information;
    transmitting SCI Stage 1 information on a Physical Sidelink Control Channel (PSCCH), wherein the SCI Stage 1 information indicates the resource mapping for the SCI Stage 2 payload information to the PSSCH;
    performing encoding and rate matching on the SCI Stage 2 payload information, wherein the rate matching comprises at least one shortening operation on the SCI Stage 2 payload information in a first slot of the two or more slots of the PSSCH and at least one puncturing operation on the SCI Stage 2 payload information in a second slot of the two or more slots of the PSSCH; and
    transmitting the SCI stage 2 payload information on the PSSCH to one or more wireless devices, after performing the encoding, the rate matching, and the determining the resource mapping.

2. The method of claim 1, further comprising:
    attaching and distributing cyclic redundancy check (CRC) information to the payload information;
    scrambling the encoded and rate matched payload information; and
    performing modulation on the scrambled payload information.

3. The method of claim 2, wherein the encoding comprises a polar encoding operation.

4. The method of claim 3, wherein a same polar encoded and rate matched bits are transmitted in each of the aggregated two or more slots.

5. The method of claim 3, wherein different polar encoded and rate matched bits are transmitted over at least two of the aggregated two or more slots.

6. A wireless device, comprising:
a radio; and
a processor operably coupled to the radio,
wherein the wireless device is configured to:
  obtain sidelink control information (SCI) Stage 2 payload information;
  determine a resource mapping for the SCI Stage 2 payload information to a Physical Sidelink Shared Channel (PSSCH), wherein the SCI Stage 2 payload information is aggregated across two or more slots of the PSSCH, and wherein a number of resource elements (REs) used for the SCI Stage 2 payload information in a single slot is proportional to a PSSCH slot aggregation level used and a number of RE changes over successive slots for a transmission of the SCI Stage 2 payload information;
  transmit SCI Stage 1 information on a Physical Sidelink Control Channel (PSCCH), wherein the SCI Stage 1 information indicates the resource mapping for the SCI Stage 2 payload information to the PSSCH;
  perform encoding and rate matching on the SCI Stage 2 payload information, wherein the rate matching comprises at least one shortening operation on the SCI Stage 2 payload information in a first slot of the two or more slots of the PSSCH and at least one puncturing operation on the SCI Stage 2 payload information in a second slot of the two or more slots of the PSSCH; and
  transmit the SCI stage 2 payload information on the PSSCH to one or more wireless devices, after performing the encoding, the rate matching, and the determining the resource mapping.

7. The wireless device of claim 6, wherein the wireless device is further configured to:
  attach and distribute cyclic redundancy check (CRC) information to the payload information;
  scramble the encoded and rate matched payload information; and
  perform modulation on the scrambled payload information.

8. The wireless device of claim 7, wherein the encoding comprises a polar encoding operation.

9. The wireless device of claim 7, wherein the scrambling comprises using a same scrambling sequence over at least two of the aggregated two or more slots.

10. The wireless device of claim 7, wherein the scrambling comprises using a different scrambling sequence over at least two of the aggregated two or more slots.

11. The wireless device of claim 6, wherein determining the resource mapping for the SCI Stage 2 payload information comprises using a same resource mapping over at least two of the aggregated two or more slots.

12. The wireless device of claim 6, wherein determining the resource mapping for the SCI Stage 2 payload information comprises using a different resource mapping over at least two of the aggregated two or more slots.

13. An integrated circuit, comprising circuitry configured to cause a wireless device to:
  obtain sidelink control information (SCI) Stage 2 payload information;
  determine a resource mapping for the SCI Stage 2 payload information to a Physical Sidelink Shared Channel (PSSCH), wherein the SCI Stage 2 payload information is aggregated across two or more slots of the PSSCH, and wherein a number of resource elements (REs) used for the SCI Stage 2 payload information in a single slot is proportional to a PSSCH slot aggregation level used and a number of RE changes over successive slots for a transmission of the SCI Stage 2 payload information;
  transmit SCI Stage 1 information on a Physical Sidelink Control Channel (PSCCH), wherein the SCI Stage 1 information indicates the resource mapping for the SCI Stage 2 payload information to the PSSCH;
  perform encoding and rate matching on the SCI Stage 2 payload information, wherein the rate matching comprises at least one shortening operation on the SCI Stage 2 payload information in a first slot of the two or more slots of the PSSCH and at least one puncturing operation on the SCI Stage 2 payload information in a second slot of the two or more slots of the PSSCH; and
  transmit the SCI stage 2 payload information on the PSSCH to one or more wireless devices, after performing the encoding, the rate matching, and the determining the resource mapping.

14. The integrated circuit of claim 13, wherein the integrated circuit is further configured to cause the wireless device to:
  attach and distribute cyclic redundancy check (CRC) information to the payload information;
  scramble the encoded and rate matched payload information; and
  perform modulation on the scrambled payload information.

15. The integrated circuit of claim 14, wherein the encoding comprises a polar encoding operation.

16. The integrated circuit of claim 15, wherein a same polar encoded and rate matched bits are transmitted in each of the aggregated two or more slots.

17. The integrated circuit of claim 15, wherein different polar encoded and rate matched bits are transmitted over at least two of the aggregated two or more slots.

18. The integrated circuit of claim 14, wherein the scrambling comprises using a different scrambling sequence over at least two of the aggregated two or more slots.

* * * * *